(12) United States Patent
O'Connell (10) Patent No.: US 8,479,747 B2
(45) Date of Patent: Jul. 9, 2013

(54) METHOD FOR PREPARING TOBACCO EXTRACT FOR ELECTRONIC SMOKING DEVICES

(75) Inventor: Thomas O'Connell, Sunny Isles Beach, FL (US)

(73) Assignee: Global Vapor Trademarks, Inc., Pompono Beach, FL (US)

( * ) Notice: Subject to any disclaimer, the term of this patent is extended or adjusted under 35 U.S.C. 154(b) by 0 days.

(21) Appl. No.: 13/397,221

(22) Filed: Feb. 15, 2012

(65) Prior Publication Data

US 2012/0145170 A1   Jun. 14, 2012

Related U.S. Application Data

(63) Continuation of application No. PCT/US2011/035592, filed on May 6, 2011.

(60) Provisional application No. 61/347,145, filed on May 21, 2010.

(51) Int. Cl.
*A24B 1/02* (2006.01)

(52) U.S. Cl.
USPC .......................................................... 131/300

(58) Field of Classification Search
None
See application file for complete search history.

(56) References Cited

U.S. PATENT DOCUMENTS

| | | | | |
|---|---|---|---|---|
| 2,805,667 | A * | 9/1957 | Von Bethmann | 131/297 |
| 5,326,563 | A | 7/1994 | Spindler et al. | |
| 5,445,169 | A | 8/1995 | Brinkley et al. | |
| 5,791,353 | A * | 8/1998 | Junemann et al. | 131/297 |
| 2005/0016550 | A1 | 1/2005 | Katase | |
| 2009/0025739 | A1 | 1/2009 | Brinkley et al. | |

OTHER PUBLICATIONS

"Cheapskate", et al., "Nicotine Extraction and purification", Feb. 16, 2005-Sep. 7, 2008, www.sciencemadness.org, accessed via: http://www.sciencemadness.org/talk/viewthread.php?tid=3404, see entries on Feb. 19-Feb. 20, 2005.*
"wiseGeek.com", "What is Double Brewed Coffee?", Dec. 29, 2007 (see google search results date), Conjecture Corporation, accessed via: http://www.wisegeek.com/what-is-double-brewed-coffee.htm.*
Burns, D.M. et al., "Mandated lowering of toxicants in cigarette smoke: a description of the World Health Organization TobReg Proposal", 2008, Tobacco Control, 17: pp. 132-141.
International Search Report and Written Opinion of the International Searching Authority for International Appl. No. PCT/US2011/35592, dated Nov. 1, 2011.
Wikipedia, "Espresso Machine", Mar. 21, 2011, 5pp.
How to Grow Tobacco.com, "Extracting Liquid nicotine for e-cigarettes", Mar. 21, 2011, 8pp.
International Preliminary Report and Written Opinion of the International Searching Authority for International Application No. PCT/US11/35592, Dated Nov. 27, 2012, 8 pages.

* cited by examiner

*Primary Examiner* — Michael J Felton
(74) *Attorney, Agent, or Firm* — Fanelli Haag & Kilger PLLC (57) ABSTRACT

A method and a system for preparing a tobacco extract for use in an electronic smoking device are provided. A tobacco extract and an electronic smoking device are also provided. The method includes grinding tobacco into granulated particles, and heating purified water. The method further includes injecting the heated purified water through the granulated particles of the tobacco for a predetermined period of time to produce an aqueous solution, and adding purified water to the aqueous solution. Further, the method includes heating the aqueous solution, and injecting the heated aqueous solution through ground tobacco for the predetermined period of time to produce a tobacco extract for use in the electronic smoking device.

30 Claims, 3 Drawing Sheets

METHOD FOR PREPARING TOBACCO EXTRACT FOR ELECTRONIC SMOKING DEVICES

CROSS REFERENCE TO RELATED APPLICATIONS

This application is a continuation of International Application No. PCT/US2011/035592, filed May 6, 2011, which is a non-provisional of U.S. Provisional Application No. 61/347,145, filed May 21, 2010. The subject matter of these earlier filed applications is hereby incorporated by reference.

BACKGROUND

1. Field

Embodiments of the invention relate to a method for preparing a tobacco extract. More specifically, certain embodiments of the invention are directed to a method, an apparatus and a system for preparing a tobacco extract which can be used in electronic smoking devices.

2. Description of the Related Art

An electronic smoking device, such as an electronic cigarette or an electronic pipe, is an electrical device that simulates the act of tobacco smoking by producing an inhaled mist having the appearance, the physical sensation, and the flavor and nicotine content of inhaled tobacco smoke without the harmful health risks of conventional smoking products.

Known electronic smoking devices include an atomizing element, for example, a nebulizer or atomizer, which uses heat to volatilize contents of a nicotine cartridge which is inhaled by a user. The nicotine cartridge typically contains a propylene glycol- or glycerin-based liquid solution. The heating element is controlled by a computer chip that is activated by the inhalation or "draw" of the user on the end of electronic smoking devices. Typically, the opposite end of electronic smoking devices will include a light that glows when the device is being "smoked" or drawn upon by the user to simulate the appearance of smoking.

Electronic smoking devices offer significant health benefits compared to conventional smoking products. For example, with conventional smoking products, the user is exposed to carcinogens when tobacco, for example, in a cigarette or a pipe, is burned. Whereas, by simply inhaling nicotine using electronic smoking devices, the user may avoid exposure to the carcinogens.

Although there are many significant health benefits to electronic smoking devices, some organizations such as the United States Food and Drug Administration (FDA) have not considered electronic smoking devices as a reduced risk product in the United States. Proponents of electronic smoking devices have requested that the FDA offer clarity to consumers and the industry as to what constitutes a reduced risk product. The FDA's current parameters defining a reduced risk product in the United States market are considered by many to be unclear.

Proponents of electronic smoking devices argue that the effluent from electronic smoking devices is a vapor, not a smoke, and therefore electronic smoking devices are exempted from bans on smoking in public places. This argument is accepted by authorities in many jurisdictions in the United States and by private entities that create their own smoking guidelines.

A significant source of controversy has been the appropriate regulatory treatment of electronic smoking devices. Some believe that the use of the nicotine cartridge in electronic smoking devices means that the product represents a nicotine delivery device subject to regulation as a drug by the FDA (or similar health authority). Nicotine has a long history of regulation as a drug in the United States and in foreign jurisdictions, including nicotine inhalation products, such as those sold as over-the-counter products in the United Kingdom. Nicotine is approved for the therapeutic indication of smoking cessation. Cessation is at least related to the intended use of electronic smoking devices which presumably will be used as a substitute to conventional smoking products.

Some proponents of electronic smoking devices argue that this device should not be regulated as a drug delivery device because of its potential benefits to the public health. While electronic smoking devices do offer significant health benefits, a health benefit to the user has historically not been a satisfactory reason to ignore or avoid an application of the FDA's guidelines and rules for the advancement of product safety. Concern has grown that electronic smoking devices are not being made safely or sold as represented. For example, some electronic smoking devices are known to be ineffective for the intended purpose of delivering nicotine.

Proponents of electronic smoking devices further argue that the unnecessary treatment of electronic smoking devices as a drug increases costs that may limit the use of the product or places limits on marketing the product.

The FDA has selectively banned the importation of nicotine cartridges in the United States, leading to litigation with several marketers of electronic smoking devices. The marketers involved in this litigation argue that their products should be regulated as tobacco products, not as drug products, although in many situations the marketers are inconsistent with the way that they treat their own product as a tobacco product (i.e., the marketers fail to affix a proper tobacco health warning label on electronic smoking devices). The courts have had differing opinions on whether the FDA's implementation of a ban on these electronic smoking devices is proper or not. Many countries, such as New Zealand, Turkey, Australia, Mexico, and Brazil, ban the use of electronic smoking devices.

Online smoking forums have discussed the use of tobacco extract in electronic smoking devices. These forums have primarily focused on the extraction of pure nicotine from tobacco for use in homemade versions of existing nicotine-based cartridges for electronic smoking devices. These forums have acknowledged, however, that the tobacco extract prepared by conventional methods are not considered pure extracts because they lack the appearance and the potency required by users of electronic smoking devices.

The majority of these conventional methods for preparing tobacco extract, however, require the use of non-water solvents (e.g., ammonium, polyhydric alcohol) that are not appropriate for use in a vapor inhalation device, and therefore are not authorized solvents for use in these types of applications by regulatory authorities such as the FDA.

Conventional methods also provide for the preparation of tobacco extract for use with electronic smoking devices which use treated water as a solvent. For example, the water may be treated with an alkali such as ammonia, lime, or lye. The treated water solvent is also not appropriate for use in a vapor inhalation device, and therefore also not an authorized solvent for use in these types of applications by regulatory authorities. Some conventional methods also provide for the preparation of tobacco extract using heated tap water, whereby the slurry of tobacco material and heated tap water is permitted to separate and then processed by further heating and cooling at ambient pressure. These methods produce a tobacco extract that have a lower nicotine concentration and are primarily used as flavoring agents, and therefore are not suitable for use in an electronic smoking device without the addition of additional nicotine added to the device's cartridge.

SUMMARY

In accordance with an embodiment of the invention, there is provided a method, which includes grinding tobacco into granulated particles, and heating purified water. The method further includes injecting the heated purified water through the granulated particles of the tobacco for a predetermined period of time to produce an aqueous solution, and adding purified water to the aqueous solution. Further, the method includes heating the aqueous solution, and injecting the heated aqueous solution through ground tobacco for the predetermined period of time to produce a tobacco extract for use in the electronic smoking device.

In accordance with another embodiment of the invention, there is provided a system for preparing a tobacco extract for use in an electronic smoking device. The system includes a grinder configured to grind tobacco into granulated particles, and a heater configured to heat purified water. The system further includes an injector configured to inject the heated purified water through the granulated particles of the tobacco for a predetermined period of time to produce an aqueous solution, and a mixer configured to add purified water to the aqueous solution. The heater is further configured to heat the aqueous solution, and the injector is further configured to inject the heated aqueous solution through ground tobacco for the predetermined period of time to produce a tobacco extract for use in the electronic smoking device.

In accordance with another embodiment of the invention, there is provided a tobacco extract for use in an electronic smoking device. The tobacco extract includes a composition free of non-water solvents and a nicotine content in excess of at least 1.5% measured as a tobacco extract plus more than 45% of a vapor agent.

In accordance with another embodiment of the invention, there is provided an electronic smoking device, which includes a battery, an atomizing unit, and a cartridge. The cartridge includes a tobacco extract which includes a composition free of non-water solvents and a nicotine content in excess of at least 1.5% measured as a tobacco extract plus more than 45% of a vapor agent. The cartridge is configured to be bottom filled with the tobacco extract to prevent the nebulizer from a premature failure.

BRIEF DESCRIPTION OF DRAWINGS

Further aspects, details, advantages and modifications of the invention will become apparent from the following detailed description of the embodiments, which is to be taken in conjunction with the accompanying drawings, in which.

DETAILED DESCRIPTION OF THE PREFERRED EMBODIMENT(S)

It will be readily understood that the components of the invention, as generally described and illustrated in the figures herein, may be arranged and designed in a wide variety of different configurations. Thus, the following detailed description of the embodiments of a method, an apparatus, and a system for preparing a tobacco extract which can be used in an electronic smoking device, as represented in the attached figures, is not intended to limit the scope of the invention as claimed, but is merely representative of selected embodiments of the invention.

Embodiments of the invention provide a tobacco extract which can be used as a replacement for pharmaceutical grade nicotine in an electronic smoking device. Certain embodiments of the invention provide a tobacco extract that is suitable for use in the electronic smoking device and that is prepared using an iterative process of heated water as the sole solvent and high pressure. Further, certain embodiments of the invention provide a tobacco extract that has at least one of the following characteristics: a final composition free of non-water solvents and stability agents, a low level of Hoffman analytes, a low level of tobacco specific nitrosamines (TSNA), a shelf life of at least two years, an efficacious delivery of tobacco flavor and nicotine to the user of the electronic smoking device, and sufficiently flavorful without the further addition of flavoring agents.

The embodiments discussed below may also be applied to the preparation of a marijuana extract suitable for use in an electronic smoking device for jurisdictions that permit such an application.

Figure 1:
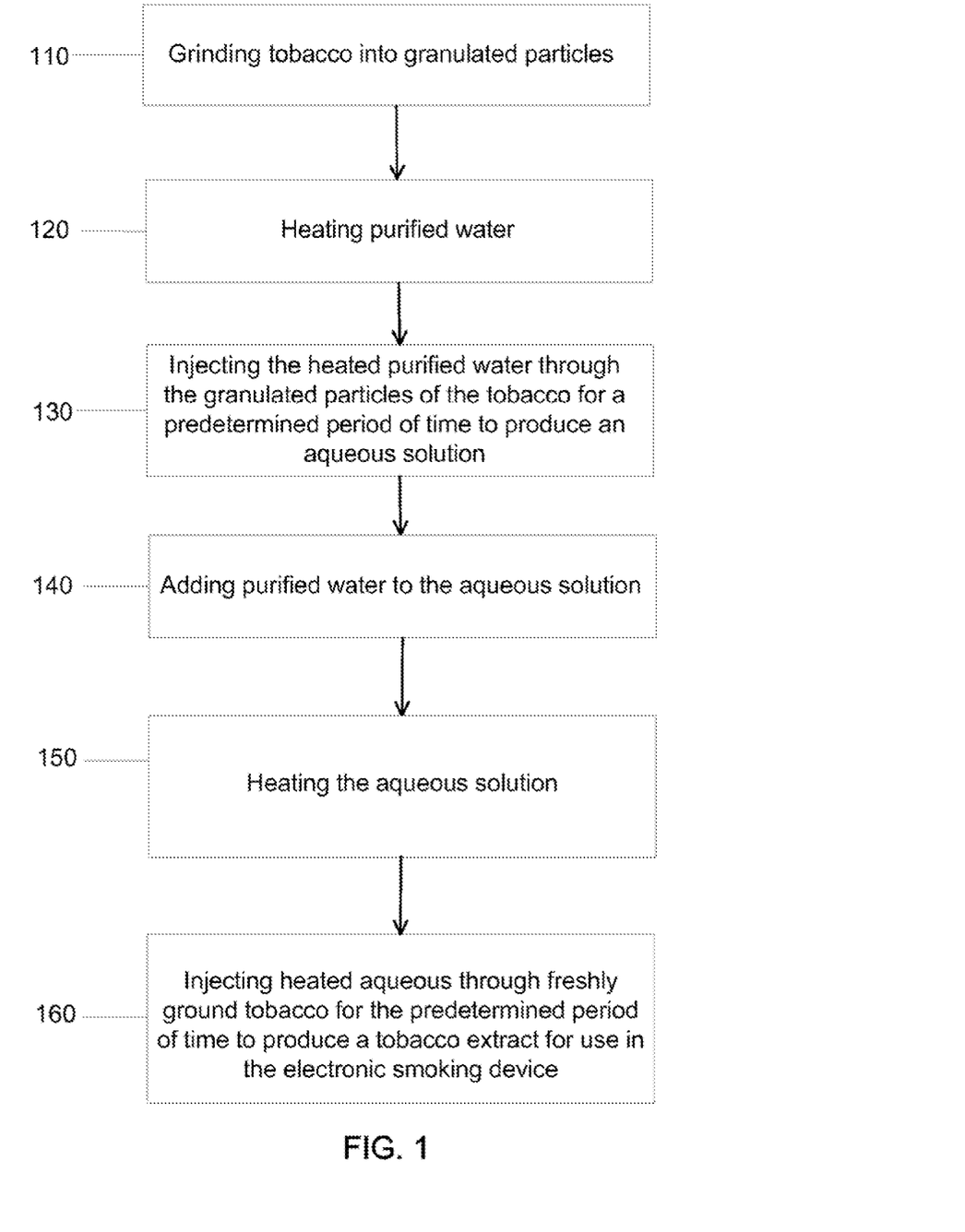
FIG. 1 shows a flow diagram of a method for preparing a tobacco extract which can be used in an electronic smoking device, in accordance with an embodiment of the invention.

FIG. 1 shows a flow diagram of a method for preparing a tobacco extract which can be used in an electronic smoking device, in accordance with an embodiment of the invention. The method includes grinding, at 110, tobacco into granulated particles, and heating, at 120, purified water. The method further includes injecting, at 130, the heated purified water through the granulated particles of the tobacco for a predetermined period of time to produce an aqueous solution, and adding, at 140, purified water to the aqueous solution. Further, the method includes heating, at 150, the aqueous solution; and injecting, at 160, the heated aqueous solution through ground tobacco for the predetermined period of time to produce a tobacco extract for use in the electronic smoking device.

In accordance with an embodiment of the invention, various tobacco varieties and blends may be used. The tobacco preferably includes high nicotine content. For example, nicotine content in tobacco leaf is typically 1-1.5%. Tobaccos designated by the United States Agricultural Department (USDA) as Type 35, Type 36, or Type 37 are common tobaccos having naturally high nicotine content. A cultivar such as *Nicotiana rustica* often also has natural nicotine content in the range of about 6-10%. Additionally, upper stalk leaves of commercial lines of flue-cured tobacco, designated by the USDA as Types 11-14, and Burley tobacco, designated by the USDA as Type 31, have naturally high nicotine content. The natural nicotine content of many tobaccos may depend upon the agronomic conditions under which the tobaccos are grown as well as the particular genetic line of the tobacco. These varietals may all be pasteurized.

The tobacco may be pasteurized to prevent mold or microbial growth for producing a stable tobacco extract in a liquid environment. Pasteurized tobacco also allows for the preparation of the tobacco extract without the need for a stability agent, for example, benzoates, sodium benzoate, sorbates, nitrites, antioxidants, such as sulfites, Vitamin E, Vitamin C, and butylated hydroxytoluene (BHT), and chelating agents, such as disodium ethylenediaminetetraacetic acid (EDTA), polyphosphates, and citric acid. Pasteurized tobacco also provides a tobacco extract with a low level of TSNA.

The grinding includes grinding a pasteurized tobacco, and more preferably a pasteurized one sucker tobacco, into granulated particles.

The purified water is heated to a temperature ranging from 150° F. to 200° F., and injected through the granulated particles of the tobacco at a pressure ranging from 9 bars to 12 bars for at least 15 minutes to produce the aqueous solution.

The aqueous solution is heated to a temperature ranging from 150° F. to 160° F., and injected through the ground tobacco for at least 15 minutes to produce the tobacco extract for use in the electronic smoking device.

The tobacco extract includes at least one of a composition free of non-water solvents, a composition free of stability agents when used in an electronic smoking device generating a level of Hoffman analytes where most elements (e.g., priority toxicants) are below 1% of the levels associated with branded cigarettes, a level of tobacco specific nitrosamines below 10 parts per billion when measured in the vapor from an electronic smoking device, a shelf life of at least two years, a nicotine content in excess of at least 1.5% measured in the liquid where the tobacco extract is combined with glycerin, and a flavoring that requires no additional flavoring agents. An optional flavor can be added.

In accordance with an embodiment of the invention, the method may further include an iterative process, which includes adding purified water to the tobacco extract to form an aqueous solution of tobacco extract, and heating the aqueous solution of tobacco extract. The iterative process also includes injecting the heated aqueous solution of tobacco extract through ground tobacco for the predetermined time to produce a refined tobacco extract for use in the electronic smoking device. The nicotine content of the refined tobacco extract is greater than the nicotine content of the tobacco extract.

In accordance with another embodiment of the invention, the adding, the heating and the injecting are repeated to produce a concentrated tobacco extract. The nicotine content of the concentrated tobacco extract is greater than the nicotine content of the refined tobacco extract.

Figure 2:
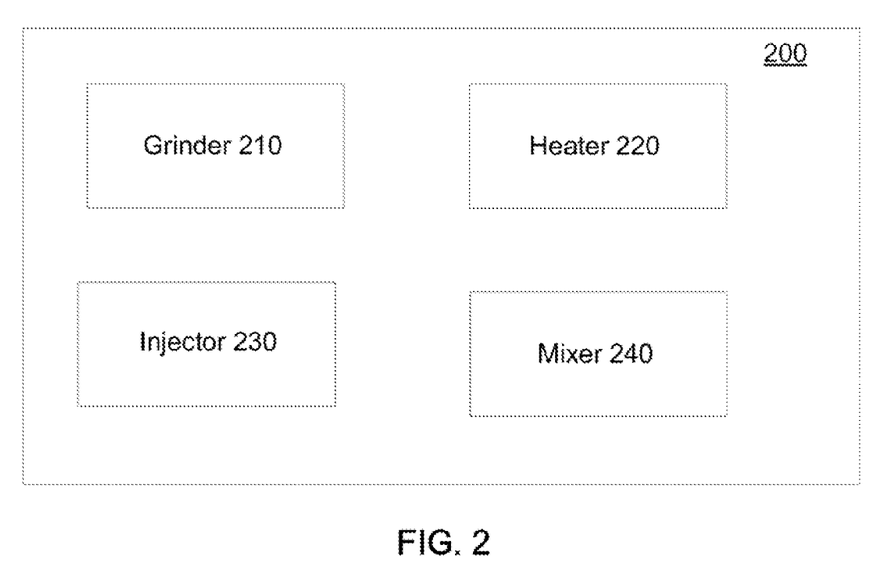
FIG. 2 shows a schematic diagram of a system for preparing a tobacco extract which can be used in an electronic smoking device, in accordance with an embodiment of the invention.

FIG. 2 shows a schematic diagram of a system for preparing a tobacco extract which can be used in an electronic smoking device, in accordance with an embodiment of the invention.

In accordance with an embodiment of the invention, the system 200 includes a grinder 210 configured to grind tobacco into granulated particles, and a heater 220 configured to heat purified water. The system further includes an injector 230 configured to inject the heated purified water through the granulated particles of the tobacco for a predetermined period of time to produce an aqueous solution of tobacco extract, and a mixer 240 configured to add the purified water to the aqueous solution of tobacco extract. The heater 220 is further configured to heat the aqueous solution of tobacco extract. The injector 230 is further configured to inject the heated aqueous solution of tobacco extract through ground tobacco for the predetermined period of time to produce the tobacco extract for use in the electronic smoking device.

Figure 3:
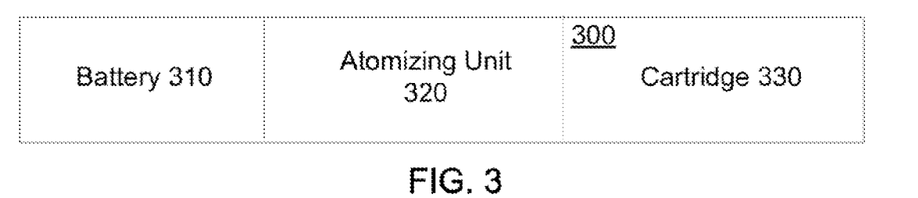
FIG. 3 shows an electronic smoking device, in accordance with an embodiment of the invention.

FIG. 3 shows an electronic smoking device, in accordance with an embodiment of the invention. The electronic smoking device 300 includes a battery 310, an atomizing unit 320, and a cartridge 330. The atomizing unit 320 may include a nebulizer or an atomizer.

In accordance with an embodiment of the invention, the cartridge 330 includes a tobacco extract, which includes a composition free of non-water solvents and a nicotine content in excess of at least 1.5% measured as a tobacco extract plus more than 45% of a vapor agent. The cartridge 330 is configured to be bottom filled with the tobacco extract to prevent the atomizing unit 320 from a premature failure. The vapor agent may include glycerin.

Examples 1-20 demonstrate that an extraction process including iterative process cycles of heated water solvent and high pressure are effective for preparing a tobacco extract that is suitable for use in an electronic smoking device. In each of the following examples, methods are described that further demonstrate the efficacy of pasteurized tobacco and a water solvent for preparing the tobacco extract with a high nicotine content that is suitable for use in the electronic smoking device.

In particular, examples 1-3 demonstrate an extraction process for preparing tobacco extract that is suitable for use in an electronic smoking device, whereby a tobacco extract prepared using more than one iterative process cycle of heated water solvent and high pressure contains higher nicotine content than a tobacco extract prepared using one less iterative process cycle.

Example 1

Pasteurized Tobacco, Single Iteration

Tobacco, for example pasteurized tobacco, was ground to a small size. 18 grams of the ground tobacco was placed in a high pressure device, for example an espresso maker. 150 grams of water heated to approximately 150-200° F. was run through the high pressure device at a pressure of approximately 9-12 bars for approximately 15 minutes. The resulting liquid material was reserved as a tobacco extract. It was observed that the tobacco extract weighed approximately 120 grams, and therefore approximately 30 grains of water had been lost, for example, through evaporation or as trapped moisture in the tobacco during the filtration/extraction process.

Example 2

Pasteurized Tobacco, Two Iterations 120 grams of tobacco extract was prepared from pasteurized tobacco using the method described above in Example 1. 30 grams of water was added to the prepared tobacco extract, producing a base level of liquid of 150 grams. Approximately 18 grams of fresh ground pasteurized tobacco was added to the high pressure device. The method described in Example 1 was repeated using the 150 grams of liquid in place of water. It was observed that the resultant tobacco extract from the second iteration weighed approximately 120 grams, and therefore approximately 30 grams of water had been lost, as observed in Example 1 (i.e., the same amount of water had been lost with only one iteration). However, the resulting tobacco extract was more concentrated (i.e., had a higher nicotine content) than the tobacco extract that resulted from a single iteration.

Example 3

Pasteurized Tobacco, Three Iterations 120 grams of tobacco extract was prepared from pasteurized tobacco using the method described above in Example 2. 30 grams of water was added to the prepared tobacco extract, producing a base level of liquid of 150 grams. Approximately 18 grams of fresh ground pasteurized tobacco was added to the high pressure device. The method described in Example 1 was repeated using the 150 grams of liquid in place of water. It was observed that the resultant tobacco extract from the third iteration also weighted approximately 120 grams, and therefore approximately 30 grams of water had been lost, as observed in Examples 1 and 2 (i.e., the same amount of water had been lost with one or two iterations). However, the resulting tobacco extract was more concentrated (i.e. had a higher nicotine content) than the tobacco extract that resulted from two iterations.

Examples 4-5 demonstrate that air cured tobacco may also be used to prepare a tobacco extract that is suitable for use in an electronic smoking device. However, the nicotine content of the tobacco extract prepared using the air cured tobacco is not as high as the tobacco extract prepared from pasteurized tobacco, nor does it have as low a level of TSNA.

Example 4

Air Cured Tobacco, One Iteration

Tobacco, for example air cured tobacco, was ground to a small size. 18 grams of the ground tobacco was placed in a high pressure device, for example an espresso maker. 150 grains of water heated to approximately 150-200 was run through the high pressure device at a pressure of approximately 9-12 bars for approximately 15 minutes. The resulting liquid material was reserved as a tobacco extract. It was observed that the tobacco extract weighed approximately 120 grains, and therefore approximately 30 grams of water had been lost, for example, through evaporation or as trapped moisture in the tobacco during the filtration/extraction process.

Example 5

Air Cured Tobacco, Two Iterations 120 grams of tobacco extract was prepared from air cured tobacco using the method described above in Example 1. 30 grams of water was added to the prepared tobacco extract, producing a base level of liquid of 150 grams. Approximately 18 grams of fresh ground air cured tobacco was added to the high pressure device. The method described in Example 4 was repeated using the 150 grams of liquid in place of water. It was observed that the resultant tobacco extract from the second iteration weighed approximately 120 grams, and therefore approximately 30 grains of water had been lost, as observed in Example 4 (i.e., the same amount of water had been lost with only one iteration). However, the resulting tobacco extract was more concentrated (i.e., had a higher nicotine content) than the tobacco extract that resulted from a single iteration.

Examples 6-10 demonstrate that the tobacco extract prepared using the method of Examples 1 and 2 are suitable for use in cartridges of various types of electronic smoking devices, such as a cigar, pipe, and cigarette. Each of the electronic smoking devices filled with the tobacco extract prepared by the methods described in these examples was found by a user to efficaciously deliver a flavorful, high-content nicotine tobacco. Furthermore, Example 10 demonstrates that the tobacco extract prepared using the method of Example 2 provided a greater nicotine satisfaction to the user than the tobacco extract prepared using the method of Example 1. It should be noted that the tobacco extract of Example 2 was prepared using an additional iterative process cycle of heated water solvent and high pressure than was used to prepare the tobacco extract of Example 1.

Example 6

Tobacco Extract of Example 1, Cigar, Propylene Glycol 47 grams of the tobacco extract prepared by the method of Example 1 was combined with 47 grams of propylene glycol, 1 gram of soda, and 3 grams of tobacco flavor. These ingredients were thoroughly mixed, for example, using a hand mixer. The user removed and emptied the contents of a nicotine cartridge of an electronic smoking device, for example, a cigar. The cartridge was then filled with the tobacco extract mixture, and then placed into the electronic smoking device. A user proceeded to use the electronic smoking device and found it to be a satisfying smoking experience, both in the flavor and nicotine content.

Example 7

Tobacco Extract of Example 1, Cigar, Glycerin

A tobacco extract was prepared using the method of Example 6; however, propylene glycol was replaced with glycerin. A user proceeded to use the electronic smoking device and found it to be a satisfying smoking experience, both in the flavor and nicotine content.

Example 8

Tobacco Extract of Example 1, Pipe, Glycerin

A tobacco extract was prepared using the method of Example 7; however, the electronic smoking device was a pipe instead of a cigar. A user proceeded to use the electronic smoking element and found it to be a satisfying smoking experience, both in the flavor and nicotine content.

Example 9

Tobacco Extract of Example 1, Cigarette, Glycerin

A tobacco extract was prepared using the method of Example 7; however, the electronic smoking device was a cigarette instead of a cigar. A user proceeded to use the electronic smoking element and found it to be a satisfying smoking experience, both in the flavor and nicotine content.

Example 10

Tobacco Extract of Example 2, Pipe, Glycerin 47 grams of the tobacco extract prepared by the method of Example 2 was combined with 47 grams of glycerin, 1 gram of soda, and 3 grams of tobacco flavor. These ingredients were thoroughly mixed, for example, using a hand mixer. The user removed and emptied the contents of a nicotine cartridge of an electronic smoking device, for example, a pipe. The cartridge was then filled with the tobacco extract mixture, and then placed into the electronic smoking device. A user proceeded to use the electronic smoking device and found it to be a satisfying smoking experience, both in the flavor and nicotine content. The user found the tobacco extract to offer a greater nicotine satisfaction than the tobacco extract prepared using the method of Example 8 (i.e., the tobacco extract prepared using only one iterative process cycle of heated water solvent and high pressure).

Example 11 demonstrates that a method for bottom filling a cartridge with a tobacco extract prevents premature failure of the atomizing unit of the electronic smoking device caused by the clustering of tobacco particles in the cartridge.

Example 11

Method for Filling a Cartridge

After consistent preparation of the tobacco extract using the method of Example 9, it was observed that the atomizing unit of the electronic smoking device prematurely failed. The particles of tobacco in the tobacco extract gathered on the atomizing unit and caused the failure of the atomizing unit. It was determined that the cartridges that were filled from the bottom, using a syringe where the needle was held just over the bottom of the cartridge, resulted in an equal dispersion of tobacco particles in the cartridge. Cartridges filled by this method were used without premature failure. It was concluded that the bottom filling method described above was an effective way to prevent premature failure of the atomizing unit from tobacco particles and to ensure atomizing unit life.

Example 12 demonstrates that the tobacco extract prepared using the method of Example 1 produces a tobacco extract with a low level of TSNA concentration (i.e., with a low carcinogenic level).

Example 12

TSNA Concentration

The tobacco extract prepared using the method of Example 1 was tested for TSNA concentration.

TABLE 1

| Tobacco Specific Nitrosamines | TSNA Type | Limits of Quantitation | Found |
|---|---|---|---|
| | NNN | .10 ppm | .37 ppm |
| | NAT | .10 ppm | .30 ppm |
| | NAB | .05 ppm | .05 ppm |
| | NNK | .10 ppm | .23 ppm |
| | Total TSNA | .10 ppm | .95 ppm |

Example 13 demonstrates that the relative efficacy of the extraction method declines as the tobacco extract is re-used in subsequent iterative process cycles. Hence, clean water is more effective at extracting nicotine in this process than the tobacco extract. This is attributed to the fact that the nicotine level of the tobacco extract is higher and is difficult to increase nicotine levels at the same level of efficiency.

Example 13

Residual Nicotine in Tobacco Extract—Examples 1, 2, 3

The remaining nicotine content of the tobacco extract was measured to determine the efficacy of the extraction methods described above for Examples 1-3. The tobacco extracts prepared using the methods of Example 1-3 were sent for nicotine testing with the following results:

TABLE 2

| Sample: | Tested for: | Limit of Quantitation (LoQ) | Found |
|---|---|---|---|
| Tobacco Extract from Example 1 | Nicotine | 2500 ppm | Below LoQ |
| | Nornicotine | 100 ppm | Below LoQ |
| | Myosmine | 25 ppm | Below LoQ |
| | Anabasine | 25 ppm | Below LoQ |
| | Anatabine | 100 ppm | Below LoQ |
| Tobacco Extract from Example 2 | Nicotine | 2500 ppm | 4212 ppm |
| | Nornicotine | 100 ppm | 162 ppm |
| | Myosmine | 25 ppm | Below LoQ |
| | Anabasine | 25 ppm | Below LoQ |
| | Anatabine | 100 ppm | 103 ppm |
| Tobacco Extract from Example 3 | Nicotine | 2500 ppm | 38,918 ppm |
| | Nornicotine | 100 ppm | 2151 ppm |
| | Myosmine | 25 ppm | Below LoQ |
| | Anabasine | 25 ppm | 140 ppm |
| | Anatabine | 100 ppm | 1083 ppm |

Example 14

Tobacco Content of Tobacco Extract

Tobacco extracts were prepared using the method of Examples 1 and 2, and sent to a lab for testing. The tobacco extract using the method of Example 1 was found to have a nicotine concentration of 1.31%. The tobacco extract using the method of Example 2 was found to have a nicotine concentration of 2.51%. These results demonstrate that iterative process cycles increase the nicotine concentration of the tobacco extract.

Example 15

Nicotine Puff Testing

A tobacco extract was prepared using the method of Example 7. Cartridges of three electronic smoking devices, for example, three different brands of electronic cigarettes were filled, placed into the respective electronic cigarettes, and then taken to a lab for nicotine puff testing. Multiple cartridges and electronic cigarettes were filled for this test. In nicotine puff testing, the cigarette (or other electronic smoking device) is placed in a machine that simulates smoking by drawing on the electronic smoking device and measures the nicotine in the puffs.

TABLE 3

| ID Number | XAD-4 Sorbent Position | Nicotine (μg/cartridge) |
|---|---|---|
| 1 (RUYAN) | Front | 8.82 |
| 2 (RUYAN) | Front | 6.01 |
| 3 (RUYAN) | Front | 6.08 |
| 4 (RUYAN) | Front | 15.4 |
| 5 (SMOKE EVERYWHERE) | Front | 4.68 |
| 6 (N-JOY) | Front | 14.3 |
| 7 (N-JOY) | Front | 11.6 |
| 8 (SMOKE EVERYWHERE) | Front | 14.6 |
| 1 (RUYAN) | Back | 15.9 |
| 2 (RUYAN) | Back | 4.28 |
| 3 (RUYAN) | Back | 2.00 |
| 4 (RUYAN) | Back | 8.84 |
| 5 (SMOKE EVERYWHERE) | Back | 6.14 |
| 6 (N-JOY) | Back | 2.51 |
| 7 (N-JOY) | Back | 4.00 |

TABLE 3-continued

| ID Number | XAD-4 Sorbent Position | Nicotine (µg/cartridge) |
|---|---|---|
| 8 (SMOKE EVERYWHERE) | Back | 2.57 |

In connection with the tests listed in Table 3, the cartridges were measured to have a total nicotine concentration of 1780 micrograms/milliliter. The tests listed in Table 3 were also presented as aggregated data that include the number of puffs and puff volume.

TABLE 4

| Id Number | Puff Vol. (ml) | Total Puffs | TPM XAD | µg Nicotine in Front XAD Sorbent | µg Nicotine in Back XAD Sorbent | Total Nicotine (µg/ cartridge) |
|---|---|---|---|---|---|---|
| 1 (RUYAN) | 35 | 150 | 0.62 | 8.82 | 15.9 | 24.7 |
| 2 (RUYAN) | 35 | 132 | 0.56 | 6.01 | 4.28 | 10.3 |
| 3 (RUYAN) | 35 | 100 | 0.44 | 6.08 | 2.00 | 8.08 |
| 4 (RUYAN) | 35 | 100 | 0.52 | 15.4 | 8.84 | 24.2 |
| 5 (SMOKE EVERYWHERE) | 35 | 20 | 0.34 | 4.68 | 6.14 | 10.8 |
| 6 (N-JOY) | 55 | 20 | 1.6 | 14.3 | 2.51 | 16.8 |
| 7 (N-JOY) | 55 | 20 | 0.82 | 11.6 | 4.00 | 15.6 |
| 8 (SMOKE EVERYWHERE) | 55 | 20 | 0.84 | 14.6 | 2.57 | 17.1 |

Table 4 demonstrates that the total nicotine extraction from cartridges of cigarettes 1-4 is not dramatically higher than the total nicotine extraction from cartridges of cigarettes 5-8, although the number of puffs for the cartridges of cigarettes 1-4 was much greater. This was attributed to the overheating of the atomizing unit. The atomizing unit does not function well at high puff rates becoming too hot. A lower atomizing unit temperature better delivers nicotine from the electronic smoking device.

Example 16

Pasteurized Versus Air Cured Stability Tobacco

Tobacco extracts were prepared using the methods of Examples 2 and 5. Each tobacco extract was placed in a scaled beaker and the beaker was left at room temperature conditions for a period of three months. The tobacco extracts were sampled at the end of three months. The tobacco extract prepared using the method of Example 5 was rancid with observable mold. In contrast, the tobacco extract prepared using the method of Example 2 was in excellent condition and suitable for use in an electronic smoking/vapor device. The improved shelf-life of the tobacco extract prepared using the method of Example 2 was attributed to the use of pasteurized tobacco; the pasteurization process deactivating mold spores and other bacteria. It was particularly notable that excellent shelf life was achieved without the use of preservatives or stabilizing agents in a water-based product. This has the particular advantage in that the use of preservatives or stabilizing agents that are common in food use may be objected to in the inhalation context in the electronic smoking device. It also allows for the preparation of an all organic tobacco extract for use in the electronic smoking device.

Example 17

Extraction Using a Coffee Maker 36 grams of ground pasteurized tobacco was placed in a regular filter coffee maker. 300 grams of water was placed in the coffee maker and the coffee maker was turned on. Nothing came out of the coffee maker. Upon inspection, it was observed that the tobacco and the water formed sludge. It was observed that pressure which was required to extract the water and pressure could not be applied in a regular coffee maker, and therefore could not produce the tobacco extract prepared at least using the methods of Examples 1 and 2 as described above.

Example 18

Extraction by Cooking and Stirring 36 grams of ground pasteurized tobacco was placed in a pot together with 300 grams of water. The pot was placed on a conventional stove and the heater was placed on the medium setting. The tobacco and water mixture was cooked for twenty two minutes while being stirred. A substantial amount of water evaporated during the process. After cooking, the resultant tobacco extract was removed and strained, and then sent to a lab for testing to determine the nicotine content. The tobacco extract was measured to have a nicotine content of 3.7% nicotine, which was very close to the expected starting point of the tobacco. Thus, it was concluded that mere temperature and cooking was insufficient to extract nicotine into water. The conclusion was made that the pressure generated by the espresso maker places an important role in the extraction of nicotine from the pasteurized tobacco.

Example 19

Chilled Extraction Collection

A tobacco extract was prepared using the method of Example 1, with an additional step of receiving the tobacco extract from the high pressure device in an ice chilled vessel. By quickly chilling the tobacco extract, less nicotine was lost from the system and sublimed into the air.

Example 20

Testing for Hoffman Analytes

A tobacco extract was prepared using the method of Example 3, with the exception that ten iterative process cycles were performed. The resultant tobacco extract was combined with glycerin such that the final concentration of the tobacco extract was 60% glycerin, 37% tobacco extract, and 3% baking soda. This composition of the tobacco extract was tested for Hoffmann analytes in an electronic vapor device.

Two testing protocols were used. The first protocol employed was 55 ml puff volume, 11 puff count (per cig), 30 second duration with 0% vent blocking. For this first protocol, mainstream tobacco smoke was analyzed as follows: MS TPM 7.01 mg/cig (and additional results at 6.04 mg/cig, 6.03 mg/cig and 5.14 mg/cig), CO<0.159 mg/cig; nicotine 0.060 mg/cig; Tar 6.36 mg/cig; diethylene glycol<0.024 mg/cig; formaldehyde 6.60 µg/cig; acetaldehyde 12.5 µg/cig; acetone 2.93 µg/cig; acrolein 1.84 µg/cig; propionaldehyde 0.968 µg/cig; crotonaldehyde<0.658 µg/cig but >0.198 µg/cig; MEK, 0.220 µg/cig; butyraldehyde 1.29 µg/cig; hydroquinone<0.361 µg/cig; resorcinol<0.105 µg/cig; catechol<0.322 µg/cig; phenol<1.3 µg/cig but >0.382 µg/cig; m±p cresols<0.339 µg/cig but >0.102 µg/cig; o-Cresol 0.252 µg/cig; benzo[a]pyrene<0.423 ng/cig; impinger HCN below quantifiable limits (i.e. <0.035 µg/cig); PAD HCN below quantifiable limits; total HCN<1.17 µg/cig but >0.35 µg/cig; 1,3-butadiene<0.405 µg/cig; isoprene<3.68 µg/cig; acrylonitrile<0.619 µg/cig; benzene<1.93 µg/cig; toluene<5.34 µg/cig; NNN 3.07 ng/cig; NAT 1.68 ng/cig; NAB 0.336 ng/cig; NNK 0.996 ng/cig; Harman<27.6 ng/cig; and norharman<43.2 ng/cig.

The second protocol employed as 55 ml puff volume, 21 puff count (per cig), 30 second duration with 0% vent blocking. For this second protocol, mainstream tobacco smoke was analyzed as follows: MS TPM 12.6 mg/cig (and additional results at 8.98 mg/cig and 8.85 mg/cig), CO<0.159 mg/cig; water 2.95 mg/cig; nicotine 0.096 mg/cig; Tar 9.55 mg/cig; diethylene glycol<0.024 mg/cig; formaldehyde 19.7 µg/cig; acetaldehyde 304 µg/cig; acetone 101 µg/cig; acrolein 29.7 µg/cig; propionaldehyde 22.3 µg/cig; crotonaldehyde 5.33 µg/cig; MEK 15.4 µg/cig; butyraldehyde 12.9 µg/cig; hydroquinone<0.361 µg/cig; resorcinol<0.105 µg/cig; catechol<0.322 µg/cig; phenol 1.47 µg/Cig; m+p cresols 0.444 µg/cig; o-Cresol 0.434 mg/cig; benzo[a]pyrene<0.423 ng/cig; impinger HCN 0.261 µg/cig; pad HCN 5.20 µg/cig; total HCN 5.46 µg/cig; 1,3-butadiene<0.405 µg/cig; isoprene<3.68 µg/cig; acrylonitrile<0.619 µg/cig; benzene<1.93 µg/cig; toluene<5.34 µg/cig; NNN 5.64 ng/cig; NAT 2.32 ng/cig; NAB 0.532 ng/cig; NNK 1.56 µg/cig; Harman<27.6 ng/cig; and norharman<43.2 ng/cig.

The testing for Hoffman analytes discussed above demonstrates that with better control of the heating element, increased nicotine can be provided. Because excessive heat causes a formaldehyde reading and the potential use of the formaldehyde in some steps in the cartomizer, better control of the heating elements also minimizes the potential use of the formaldehyde.

The electronic vapor device described in this example provides greater nicotine satisfaction than the nicotine figures would suggest. The nicotine may be more effectively delivered from the vapor as compared with conventional smoke. The vapor coats the lung with a very slim layer which allows the lung to absorb a greater percentage of the nicotine as compared with a smoke which is more effectively exhaled.

In this example, the 11 puff count data was concerted into liters of smoke (by multiplying out the ml puff volume). This liter denominated data from the product of this example was compared with published data from conventional cigarettes. This example further shows that the electronic vapor device according to certain embodiments of the invention to be dramatically superior in terms of the levels of analytes understood to be harmful.

The comparison products used in this example include, for example, Marlboro® and Marlboro® Light, taken from published reports as follows: Marlboro® KSF Filter Hard pack Light Ger UK EU Health Canada conditions; 35 mL puff of 2 seconds duration every 60 seconds, no vents blocked, 7.6 puffs per cigarette. Counts M E, Morton M J, Laffoon S W, el al. Smoke composition and predicting relationships for international commercial cigarettes smoked with three machine smoking test mode. Regulatory Toxicology and Pharmacology. 2005; 41:185-227, incorporated by reference. The Marlboro® Light data is taken from the same source: Marlboro® KSF Soft pack USA. 35 mL puffs, of 2 seconds duration every 60 seconds, no vents blocked, 7.9 puffs per cigarette.

This yields a comparison chart as follows:

TABLE 5

| Analyte Means | | Tobacco VaporCig | Marlboro ® Light | Marlboro ® Regular | Column 1 as % of column 3 |
|---|---|---|---|---|---|
| Puff parameters | | mist | Smoke | smoke | |
| Volume per puff | mL | 55 | 35 | 35 | |
| Duration of puff | Secs | 3 | 2 | 2 | |
| Inter-puff Interval | Secs | 30 | 60 | 60 | |
| Analytes | | | | | |
| Nicotine | Mg | 0.099 | 1.99 | 3.69 | 2.7 |
| CO | Mg | <0.263* | 24.06 | 46.66 | 0.3 |
| Acetaldehyde | Mcg | 20.7 | 1214 | 2174 | 0.95 |
| Formaldehyde | mcg | 10.9 | 83.1 | 119.4 | 9.1 |
| Acrolein | Mcg | 3.04 | 113.18 | 200.38 | 1.5 |
| o-cresols | Mcg | 0.44 | 6.81 | 14.72 | 3.0 |
| M + p Cresols | Mcg | 0.56 to 0.168# | 18.05 | 40.51 | 0.3 |
| Benzoalphapyrene | Mcg | <0.698* | 22.15 | 43.11 | 0.8 |
| Hydrogen cyanide | Mcg | 0.58 to 1.93# | 171.46 | 703.14 | 0.2 |
| 1,3-butadiene | Mcg | <0.67* | 115.81 | 183.74 | 0.2 |
| Acrylonitrile | Mcg | <1.02* | 13.91 | 36.17 | 1.4 |
| Benzene | Mcg | <3.19* | 97.38 | 163.49 | 1.0 |
| NNN | Ng | 5.07 | 169.2 | 567.9 | 0.9 |
| NNK | Ng | 1.65 | 101.5 | 489.9 | 0.3 |
| NAT | Ng | 2.78 | 150.0 | 504.9 | 0.6 |
| NAB | Ng | 0.556 | 24.82 | 96.21 | 0.6 |

In the above chart, priority toxicants in cigarette smoke were identified for proposed mandatory reduction by the World Health Organization (see Burns D M, Dybing E, Gray N, el al. "Mandated lowering of toxicants in cigarette smoke: a description of the World Health Organization TobReg Proposal," Tob Control 2008; 17:132-41 (incorporated by reference).

As noted above, the nicotine levels are lower than the other examples suggest because of overheating of the heating element.

However, the primary toxicants are a fraction of those found in the cigarette. This suggests that the tobacco-based electronic cigarette according to certain embodiments of the present invention may offer substantially lower health risks than conventional cigarettes, at least insofar as these risks are understood by medical science.

One having ordinary skill in the art will readily understand that the invention as discussed above may be practiced with steps in a different order than those which are disclosed. Therefore, although the invention has been described based upon these preferred and non-limiting embodiments, it would be apparent to those of skill in the relevant art that certain modifications, variations, and alternative constructions would be apparent, while remaining in the spirit and scope of the invention. Thus, the Experiment embodiments do not limit the invention to the particular listed devices and technologies. In order to determine the metes and bounds of the invention, therefore, reference should be made to the appended claims.

I claim:

1. A method for producing a tobacco extract, comprising:
   (a) providing a first composition comprising a first portion of fresh around tobacco particles;
   (b) subjecting the first composition to high pressure;
   (c) injecting heated purified water through the first composition under high pressure for a predetermined period of time to produce a first aqueous tobacco solution having a first nicotine content;
   (d) adding purified water to the first aqueous tobacco solution;
   (e) heating the first aqueous tobacco solution to form a heated aqueous tobacco solution;
   (f) subjecting a second composition comprising a second portion of fresh ground tobacco particles to high pressure; and
   (g) injecting the heated aqueous tobacco solution through the second composition for the predetermined period of time to produce the tobacco extract having a nicotine content greater than the first nicotine content of the first aqueous tobacco solution.

2. The method of claim 1, wherein the heated purified water in step (c) is heated to a temperature ranging from 150° F. to 200° F.

3. The method of claim 1, wherein injecting the heated purified water in step (c) comprises injecting at a pressure ranging from 9 bars to 12 bars.

4. The method of claim 1, wherein injecting the heated purified water in step (c) comprises injecting through the first portion of fresh ground tobacco particles for at least 15 minutes.

5. The method of claim 1, wherein heating the first aqueous tobacco solution in step (e) comprises heating to a temperature ranging from 150° F. to 160° F.

6. The method of claim 1, wherein injecting the heated aqueous tobacco solution in step (g) comprises injecting through the second composition for at least 15 minutes.

7. The method of claim 1, wherein the tobacco is pasteurized tobacco.

8. The method of claim 1, wherein the tobacco is pasteurized one sucker tobacco.

9. The method of claim 1, wherein the tobacco is selected from the group consisting of USDA Type 35, USDA Type 36, USDA Type 37, Nicotiana rustica, flue-cured tobacco, USDA Types 11-14, Burley, USDA Type 31, and blends thereof.

10. The method of claim 1, wherein the tobacco is air-cured tobacco.

11. The method of claim 1, wherein the tobacco extract is free of non-water solvents.

12. The method of claim 1, wherein the tobacco extract is free of stability agents.

13. The method of claim 1, wherein the tobacco extract has less than 10 parts per billion tobacco specific nitrosamines.

14. The method of claim 1, wherein the tobacco extract has a nicotine content in excess of at least 1.5% measured as the tobacco extract plus more than 45% of a vapor agent.

15. The method of claim 1, wherein the tobacco extract comprises a nicotine content in excess of at least 1.5% measured as the tobacco extract plus more than 45% of a vapor agent; and wherein the tobacco extract is free of non-water solvents.

16. The method of claim 1, wherein the tobacco extract has a shelf life of at least two years.

17. The method of claim 1, wherein the tobacco extract has less than 1% of Hoffmann priority toxicant analytes than those of a conventional cigarette.

18. The method of claim 1, further comprising contacting the tobacco extract with a vapor agent.

19. The method of claim 1, further comprising contacting the tobacco extract with propylene glycol or glycerin.

20. The method of claim 1, further comprising contacting the tobacco extract with a flavoring agent.

21. The method of claim 1, further comprising contacting the tobacco extract with a tobacco flavor.

22. The method of claim 1, further comprising contacting the tobacco extract with baking soda.

23. The method of claim 1, further comprising filling a cartridge, said cartridge configured for use in an electronic smoking device, with the tobacco extract, to produce a filled cartridge.

24. The method of claim 23, wherein tilling the cartridge comprises filling the cartridge from the bottom with the tobacco extract.

25. The method of claim 23, further comprising combining the filled cartridge with a battery and an atomizing unit to produce an electronic smoking device.

26. The method of claim 25, wherein the electronic smoking device is an electronic cigarette, electronic pipe, or electronic cigar.

27. The method of claim 1, further comprising vaporizing the tobacco extract with an electronic smoking device.

28. The method of claim 27, wherein the electronic smoking device is an electronic cigarette, electronic pipe, or electronic cigar.

29. The method of claim 1, further comprising:
   (h) adding purified water to the tobacco extract to form a second aqueous tobacco solution;
   (i) heating the second aqueous tobacco solution to form a second heated aqueous tobacco solution; and
   (j) injecting the second heated aqueous tobacco solution through a third composition comprising a third portion of fresh ground tobacco particles for the predetermined time to produce a refined tobacco extract, wherein the nicotine content of the refined tobacco extract is greater than the nicotine content of the tobacco extract.

30. The method of claim 29, further comprising repeating the adding of step (h), the heating of step (i), and the injecting of step (j) on fresh portions of the ground tobacco particles to produce a concentrated tobacco extract, wherein the nicotine content of the concentrated tobacco extract is greater than the nicotine content of the refined tobacco extract.

* * * * *